(12) United States Patent
Basso et al.

(10) Patent No.: US 8,850,053 B2
(45) Date of Patent: Sep. 30, 2014

(54) SYSTEM AND METHOD FOR PROVIDING INFORMATION TO USERS OF A COMMUNICATION NETWORK

(75) Inventors: Andrea Basso, Marlboro, NJ (US); David C. Gibbon, Lincroft, NJ (US); Behzad Shahraray, Holmdel, NJ (US); Herani S. Brotman, Colts Neck, NJ (US); Han Q. Nguyen, Marlboro, NJ (US); Douglas Nortz, Red Bank, NJ (US); Steven J. Solomon, Freehold, NJ (US); David A. Parisi, Dayton, NJ (US); Sunil Maloo, Edison, NJ (US); Mark W. Altom, Martinsville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 149 days.

(21) Appl. No.: 12/756,571

(22) Filed: Apr. 8, 2010

(65) Prior Publication Data

US 2011/0252156 A1 Oct. 13, 2011

(51) Int. Cl.
*G06F 15/16* (2006.01)
*H04M 7/00* (2006.01)
*H04L 29/08* (2006.01)
*H04L 29/06* (2006.01)
*H04L 1/18* (2006.01)

(52) U.S. Cl.
CPC ........... *H04M 7/0039* (2013.01); *H04L 69/326* (2013.01); *H04L 29/06517* (2013.01); *H04L 29/06476* (2013.01); *H04L 29/06448* (2013.01); *H04L 1/1838* (2013.01)
USPC .......................................... 709/231; 380/212

(58) Field of Classification Search
CPC .............. H04M 7/0039; H04L 69/326; H04L 29/06517; H04L 29/06476; H04L 29/6448; H04L 1/1838
USPC ........................................................ 709/231
See application file for complete search history.

(56) References Cited

U.S. PATENT DOCUMENTS

| | | | |
|---|---|---|---|
| 6,850,987 B1 | 2/2005 | McCanne et al. |
| 6,918,120 B2 | 7/2005 | Riedel |
| 7,020,697 B1 | 3/2006 | Goodman et al. |
| 7,590,889 B1 | 9/2009 | Maxemchuk et al. |
| 7,596,107 B1 | 9/2009 | Andriantsiferana |
| 7,606,186 B2 | 10/2009 | Hundscheidt et al. |
| 7,634,568 B2 | 12/2009 | McConnell et al. |
| 7,643,476 B2 | 1/2010 | Frank et al. |
| 7,643,478 B2 | 1/2010 | Lecomte et al. |
| 7,643,480 B2 | 1/2010 | Liu et al. |

(Continued)

OTHER PUBLICATIONS

Google Patents Search.*

(Continued)

*Primary Examiner* — Arvin Eskandarnia
(74) *Attorney, Agent, or Firm* — Wolff & Samson, PC

(57) ABSTRACT

A plurality of multimedia data streams that are being provided via an internet protocol (IP) network is received, wherein each multimedia data stream carries multimedia content. Real-time metadata relating to the plurality of multimedia data streams is generated based on the multimedia content. The metadata is provided in real-time in a metadata stream to a plurality of user devices, via the IP network. The plurality of multimedia data streams may be multicast within the IP network. The metadata may be multicast in real-time in a metadata stream to a plurality of user devices, via the IP network.

11 Claims, 5 Drawing Sheets

(56) References Cited

U.S. PATENT DOCUMENTS

| | | | |
|---|---|---|---|
| 2003/0177503 A1* | 9/2003 | Sull et al. | 725/105 |
| 2008/0040743 A1* | 2/2008 | Dharmaji | 725/35 |
| 2008/0086754 A1* | 4/2008 | Chen et al. | 725/105 |
| 2008/0098420 A1* | 4/2008 | Khivesara et al. | 725/32 |
| 2008/0212672 A1* | 9/2008 | Ahn et al. | 375/240.01 |
| 2008/0301304 A1* | 12/2008 | Chitsaz et al. | 709/228 |
| 2009/0187951 A1* | 7/2009 | McCarthy et al. | 725/58 |
| 2010/0115575 A1* | 5/2010 | Yu et al. | 725/142 |
| 2010/0153410 A1* | 6/2010 | Jin et al. | 707/758 |
| 2010/0169504 A1* | 7/2010 | Gabin et al. | 709/231 |
| 2010/0319004 A1* | 12/2010 | Hudson et al. | 719/313 |
| 2011/0066743 A1* | 3/2011 | Hurley et al. | 709/231 |
| 2011/0191800 A1* | 8/2011 | Makowski et al. | 725/34 |
| 2011/0231868 A1* | 9/2011 | Martens | 725/13 |

OTHER PUBLICATIONS

IEEE search.*
IP.com search.*
ACM search.*
David C. Gibbon, Zhu Liu, Behzad Shahraray, The MIRACLE Video Search Engine, Consumer Communications and Networking Conference, 2006. CCNC 2006. 3rd IEEE, Jan. 8-10, 2006, pp. 277-281, vol. 1.

* cited by examiner

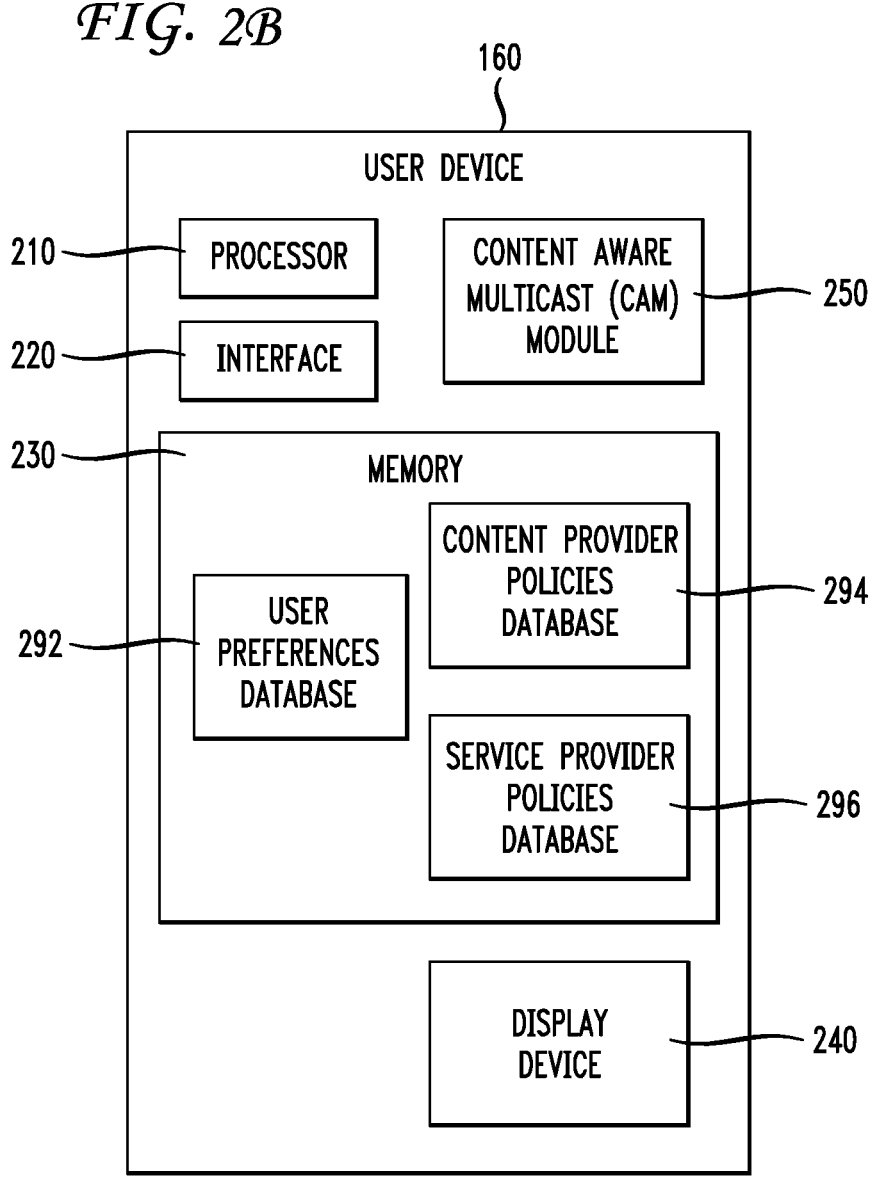

SYSTEM AND METHOD FOR PROVIDING INFORMATION TO USERS OF A COMMUNICATION NETWORK

FIELD OF THE INVENTION

This specification relates generally to a system and method for providing information to users of a communication network.

BACKGROUND

Recent advances in communication technology have made possible the delivery of multimedia data streams to multiple users in a communication network. Many current delivery systems store multimedia content, such as recorded videos, and may generate other types of content, such as live data streams of sporting events, at centralized and/or distributed locations. Typically, when a user wishes to view content, a request for content is transmitted from the user to the centralized location, and/or to one or more distributed locations, and a search is performed at the centralized and/or distributed locations to identify content matching the user's request. When content matching the user's request is identified, the content is offered to the user. The content may be provided to the user in the form of a unicast transmission.

Current systems are often inefficient and costly. Performing searches of available content in response to user's requests can be time-consuming. In addition, establishing a unicast channel for each user who requests content can result in an inefficient use of resources.

SUMMARY OF THE INVENTION

In an embodiment, a method for providing information to multiple users in a communication network is provided. A plurality of multimedia data streams that are being provided via an internet protocol (IP) network is received, wherein each multimedia data stream carries multimedia content. Real-time metadata relating to the plurality of multimedia data streams is generated based on the multimedia content, and may be combined with static metadata relating to the same content. Such combined metadata is provided in real-time in a metadata stream to a plurality of user devices, via the IP network.

The plurality of multimedia data streams may be multicast within the IP network, for example. The metadata may be multicast in real-time in a metadata stream to a plurality of user devices, via the IP network. At least one data stream in the plurality of multimedia data streams may carry information relating to at least one of: a live sporting event, a live concert, a live news broadcast, a recorded video, and a broadcast television show.

The method may further comprise providing, in the metadata stream, information relating to at least one of: a user preference, a content provider policy, or a service provider policy. For example, the information may relate to a content provider policy stipulating that a respective one of the one or more multimedia data streams may be provided only to users located in a specified geographic region. In another example, the information may relate to a service provider policy stipulating that a user device receiving the metadata stream must receive a second multimedia data stream carrying one or more advertisements at a specified time.

In another embodiment, a method is provided that comprises receiving a metadata stream via an IP network, wherein the metadata stream is provided to a plurality of user devices in the network, and obtaining from the metadata stream information relating to one or more multimedia data streams that are being provided via the IP network. A selected portion of the information is provided to a user based on one or more predetermined policies. The metadata stream may be continuously multicast within the IP network. The one or more multimedia data streams may be multicast via the IP network.

The one or more policies may include at least one of a user preference, a content provider policy, or a service provider policy. Information relating to the one or more policies may be received in the metadata stream.

In another embodiment, an apparatus for providing information to multiple users in a communication network is provided. The apparatus comprises means for receiving a plurality of multimedia data streams that are being provided via an IP network, wherein each multimedia data stream carries multimedia content. The apparatus also comprises means for generating real-time metadata relating to the plurality of multimedia data streams, based on the multimedia content, and means for providing the metadata in real-time in a metadata stream to a plurality of user devices, via the IP network. The metadata stream may also include static metadata relating to the plurality of multimedia data streams. The apparatus may also comprise means for multicasting the metadata in real-time in a metadata stream to a plurality of user devices, via the IP network.

BRIEF DESCRIPTION OF THE DRAWINGS

FIG. 2B is a block diagram of exemplary components of a user device, in accordance with an embodiment;

DETAILED DESCRIPTION

In exemplary embodiments, systems and methods for providing information to users of a communication system are provided. A plurality of multimedia data streams, which may carry live and/or recorded programming content, are multicast via an Internet Protocol (IP) based network. A metadata stream containing metadata pertaining to the multimedia data streams, and metadata pertaining to the content carried by the multimedia data streams, is also multicast in real-time via the IP-based network to multiple user devices in the communication system.

When a user device receives the metadata stream, an appropriately configured module in the user device extracts information from the metadata that relates to the one or more multimedia data streams that are currently being multicast. The user device may also extract selected data from the multimedia data streams based on the metadata. The user device provides the information and data in real-time to the user, via a display on the user device, for example.

Figure 1:
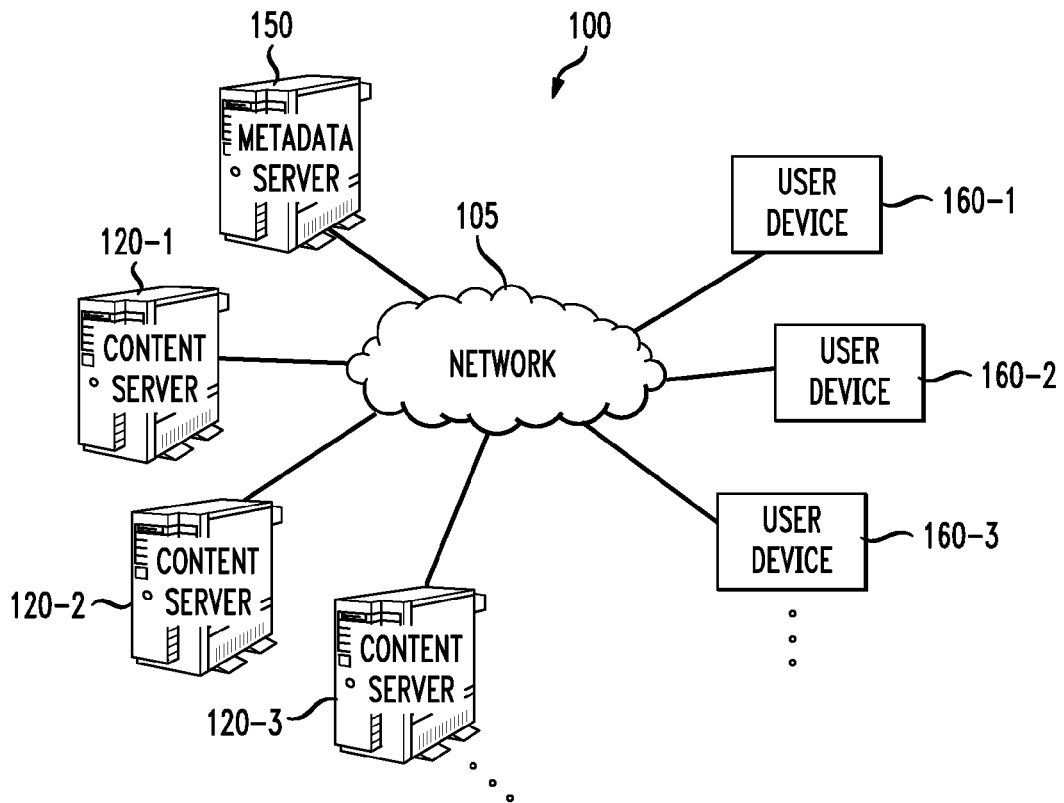
FIG. 1 is an example of a communication system, in accordance with an embodiment.

FIG. 1 is an example of a communication system, in accordance with an embodiment. Communication system 100 comprises a network 105, a metadata server 150, one or more content servers 120, and a plurality of user devices 160.

Network 105 comprises an Internet Protocol (IP)-based network. Data transmitted within network 105 is transmitted in packetized data streams in accordance with IP protocols. Use of IP protocols to transmit data is known. Network 105 may comprise one or more of a number of different types of networks, such as, for example, an intranet, a local area network (LAN), a wide area network (WAN), an internet, Fibre Channel-based storage area network (SAN) or Ethernet. In some embodiments, network 105 comprises a wireless network. Other networks may be used. Alternatively, network 105 may comprise a combination of different types of networks.

Content servers 120 provide multiple multimedia data streams via network 105. In an exemplary embodiment, content servers 120 multicast multimedia data streams carrying multimedia content such as movies, live sports events, news broadcasts, music concerts, advertisements, etc. In one example, a content server 120 may receive from another source (not shown) live video data of a sporting event, and multicast the live video data in a multimedia data stream via network 105. In another example, a content server 120 may retrieve from storage (not shown) a recorded video of a movie, and multicast the video via network 105. Other types of data may be multicast. Multicasting is known. In other embodiments, content servers 120 may use other methods to provide multimedia data streams via network 105.

In the example of FIG. 1, three content servers 120-1, 120-2, and 120-3 are shown; however, communication system 100 may include more or fewer content servers. Any discussion herein referring to "content server 120" may apply to any one, or all, of content servers 120-1, 120-2, and 120-3. Each content server 120 may comprise one or more computers controlled by appropriately configured software, for example.

Metadata server 150 generates metadata, including real-time metadata and static metadata, relating to the multimedia data streams that are being provided by content servers 120, and provides the metadata in real-time to user devices 160 via network 105. In an exemplary embodiment, metadata server 150 multicasts the metadata in a metadata stream to user devices 160, via IP network 105. In another embodiment metadata server 150 may multicast to user devices 160 more than one metadata stream. In other embodiments, metadata server 150 may use other methods to provide metadata to user devices 160.

In an exemplary embodiment, metadata server 150 receives one or more multimedia data streams from content servers 120 and generates metadata, including real-time metadata, based on the content of the multimedia data streams. In other embodiments, metadata server 150 may receive, from a third party source, metadata pertaining to one or more multimedia data streams generated by the third party source. In such instance, metadata server 150 incorporates the received metadata into a metadata stream that is multicast to user devices 160. Metadata server 150 may also generate static metadata, such as electronic program guide information, description of events from internet sites, etc.

In exemplary embodiments, metadata server 150 provides metadata in real-time to user devices 160. As used herein, metadata is provided in "real-time" if the metadata comprises information pertaining to content in a respective multimedia data stream that is being multicast within communication system 100, and the metadata is multicast substantially simultaneously with the content to which it pertains. Such metadata may be referred to herein as "real-time" metadata. Such real-time metadata may be generated by content analysis techniques described in, for example, Gibbon, D. C. et al., "The MIRACLE Video Search Engine," Consumer Communications and Networking Conference, 2006, $3^{rd}$ IEEE, Vol. 1, pp. 277-281, which is hereby incorporated by reference herein in its entirety. Real-time metadata generated by metadata server 150 may comprise content-specific information relating to programs currently being multicast, such as: a current score of a basketball game, the names of actors/actresses that are currently on screen in a movie, the name of a guest who is currently speaking on a talk show, the name of a song that is currently being played at a concert, etc.

Each user device 160 comprises a communication device capable of receiving information via network 105. For example, each user device 160 may comprise a personal computer, a laptop computer, a television, a workstation, a mainframe computer, a cellular telephone, a personal digital assistant, a Blackberry device, a pager, etc. In other embodiments, user devices 160 may comprise other types of devices.

In the example of FIG. 1, three user devices 160-1, 160-2, and 160-3 are shown; however, communication system 100 may include more or fewer user devices. Any discussion herein referring to "user device 160" may apply to any one, or all, of user devices 160-1, 160-2, and 160-3.

Figure 2A:
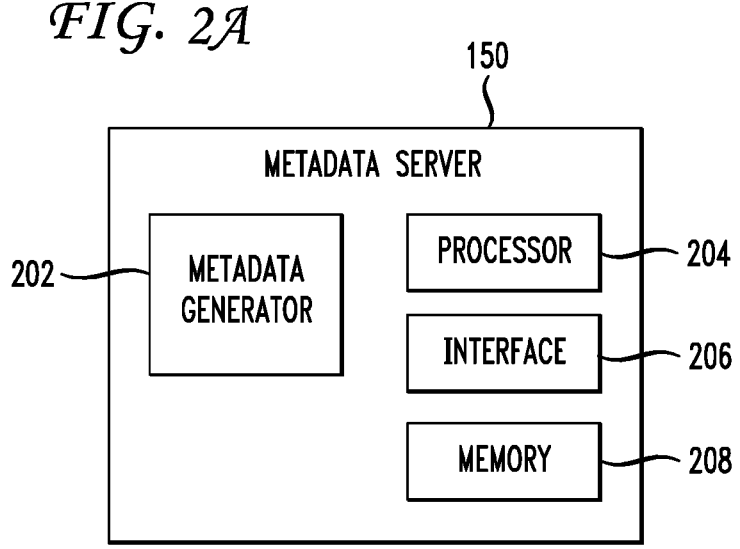
FIG. 2A is a block diagram of exemplary components of a metadata server, in accordance with an embodiment.

FIG. 2A is a block diagram of exemplary components of a metadata server 150, in accordance with an embodiment. Metadata server 150 may comprises one or more computers. Metadata server 150 comprises a processor 204, an interface 206, and a memory 208. Processor 204 controls various operations of metadata server 150 by executing computer program instructions which define such operations. The computer program instructions may be stored on a memory device such as a random access memory (RAM), one or more disk drives, one or more optical disks, one or more tape drives, etc. Processor 204 may comprise hardware, software, or a combination of hardware and software. For example, in one embodiment, processor 204 comprises operating system software controlled by hardware, such as a central processing unit (CPU).

Interface 206 provides a communication gateway through which data may be transmitted between components of metadata server 150 and network 105. Interface 206 is configured to provide metadata to user devices 160 via network 105. In one embodiment, interface 206 is configured to multicast a metadata stream to user devices 160 via network 105. In various embodiments, interface 206 may be implemented using a number of different mechanisms, such as one or more enterprise systems connection cards, modems, or network interfaces. Other types of interfaces may be used.

Memory 208 is accessed by processor 204 and/or other components of metadata server 150 to store various types of information. For example, in one embodiment, processor 204 may cause data to be stored in one or more databases in memory 208. Memory 208 may comprise any one or more of a variety of different types of memory devices, such as random access memory (RAM), one or more disk drives, one or more optical disks, one or more tape drives, etc. Other types of memory devices may be used.

Metadata server 150 also comprises a metadata generator 202. Metadata generator 202 receives multiple multimedia streams, and/or information relating to multiple multimedia data streams that are being provided within network 105 and generates metadata, including real-time metadata, relating to the data streams. Metadata generator may also generate static metadata relating to the data streams. Metadata generator 202 causes the metadata to be provided in real-time to users in a metadata stream, via network 105. The metadata stream may be multicast to user devices 160 via a dedicated metadata channel, for example.

Metadata generator 202 may comprise a software program that includes multiple modules or subroutines providing respective services or functions, for example. In other embodiments, metadata generator 202 may comprise multiple software programs. In alternative embodiments, metadata generator 202 may comprise hardware, or a combination of hardware and software. Metadata generator 202 may comprise a computer readable medium, such as a magnetic disk, magnetic tape, or optical disk, that includes instructions in the form of computer code operable to perform various functions. In some embodiments, some or all of metadata generator 202 may comprise instructions in the form of computer code that are stored in memory 208.

In other embodiments, metadata server 150 may comprise other components (software or hardware) in addition to those discussed herein.

FIG. 2B is a block diagram of exemplary components of a user device 160, in accordance with an embodiment. User device 160 comprises a processor 210, an interface 220, and a memory 230. Processor 210 controls various operations of user device 160 by executing computer program instructions which define such operations. The computer program instructions may be stored in a memory device such as a random access memory (RAM), one or more disk drives, one or more optical disks, one or more tape drives, etc. Processor 210 may comprise hardware, software, or a combination of hardware and software. For example, in one embodiment, processor 210 comprises operating system software controlled by hardware, such as a central processing unit (CPU).

Interface 220 provides a communication gateway through which data may be transmitted between components of user device 160 and network 105. In various embodiments, interface 220 may be implemented using a number of different mechanisms, such as one or more enterprise systems connection cards, modems, or network interfaces. Other types of interfaces may be used.

Memory 230 is accessed by processor 210 and/or other components of user device 160 to store various types of information. In the example of FIG. 2B, components of user device 160 store data from time to time in a user preferences database 292, a content provider policies database 294, and a service provider policies database 296, which are maintained in memory 230. Memory 230 may comprise any one or more of a variety of different types of memory devices, such as random access memory (RAM), one or more disk drives, one or more optical disks, one or more tape drives, etc. Other types of memory devices may be used.

User device 160 also comprises a display device 240 which displays information to a user. Display device 240 may comprise a liquid crystal display (LCD) screen, for example. Other types of display devices may be used.

User device 160 also comprises a content aware multicast (CAM) module 250. CAM module 250 receives a metadata stream transmitted by metadata server 150 via network 105. CAM module 250 may select a program from among the multimedia data streams that are being multicast by content servers 120, based at least in part on information in the metadata stream. CAM module 250 may also select a program from among the multimedia data streams based in part on information received from a user, and based in part on one or more sets of policies or rules.

CAM module 250 may comprise a software program that includes multiple modules or subroutines providing respective services or functions, for example. In other embodiments, CAM module 250 may comprise multiple software programs. In alternative embodiments, CAM module 250 may comprise hardware, or a combination of hardware and software. CAM module 250 may comprise a computer readable medium, such as a magnetic disk, magnetic tape, or optical disk, that includes instructions in the form of computer code operable to perform various functions. In some embodiments, some or all of CAM module 250 may comprise instructions in the form of computer code that are stored in memory 230.

In other embodiments, user device 160 may comprise other components (software or hardware) in addition to those discussed herein.

Figure 3A:
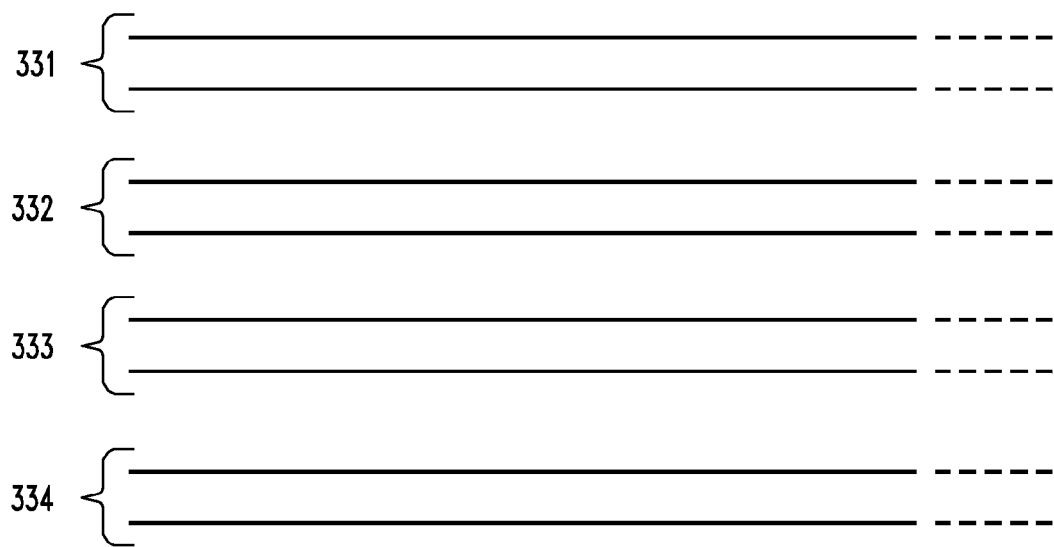
FIG. 3A shows four exemplary data streams that may be multicast within a communication system, in accordance with an embodiment.

In an exemplary embodiment, content servers 120 multicast within communication system 100 a plurality of multimedia data streams each corresponding to a respective programming channel carrying programming content. FIG. 3A is an exemplary illustration of four data streams 331, 332, 333, and 334 that may be multicast within communication system 100 by content servers 120, in accordance with an embodiment. Each data stream 331-334 corresponds to a programming channel carrying multimedia content such as a recorded movie, a live sporting event, a live concert, a broadcast television show, etc. For example, data stream 331 may correspond to a sports channel carrying a live sporting event, data stream 332 may correspond to a channel carrying a television show, data stream 333 may correspond to a channel carrying a recorded movie, etc. In other embodiments, each data stream 331-334 may carry multiple channels, and thus multiple programs, in a multiplexed format, or in another manner. It is to be understood that while in this example, four data streams 331-334 are multicast, in other examples more or fewer data streams may be multicast within communication system 100 by content servers 120.

Figure 3B:
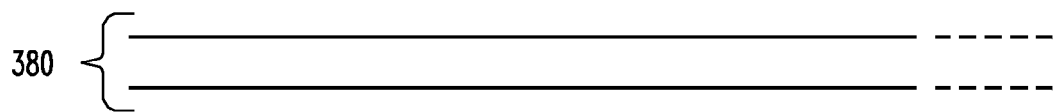
FIG. 3B shows an example of a metadata stream that may be multicast within a communication system, in accordance with an embodiment.
Figure 4:
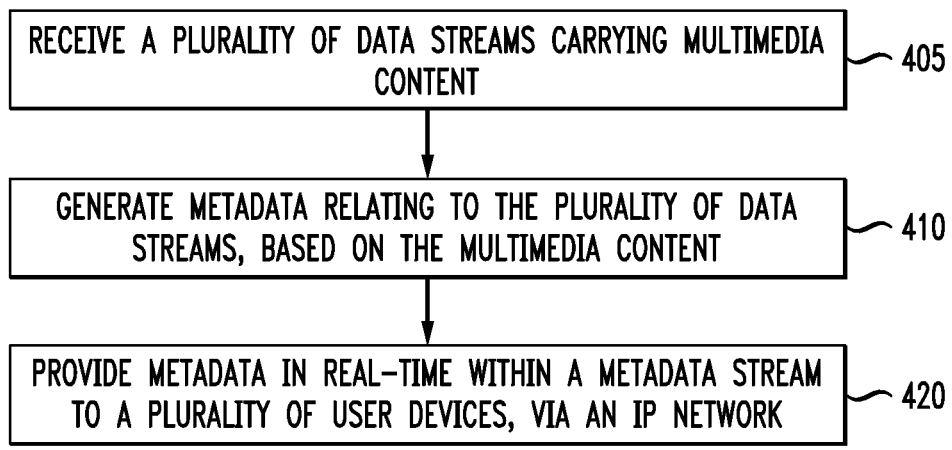
FIG. 4 is a flowchart depicting a method for providing information to multiple users in a communication network, in accordance with an embodiment.

In the exemplary embodiment, metadata server 150 continuously multicasts a metadata stream carrying metadata relating to the information carried in data streams 331-334. FIG. 4 is a flowchart depicting a method for providing information in a metadata stream to multiple users in a communication network, in accordance with an embodiment. At step 405, a plurality of data streams carrying multimedia content is received. In the exemplary embodiment, metadata server 150 receives multimedia data streams 331-334 from content servers 120. At step 410, metadata relating to the data streams is generated, based on the content in the data streams. Metadata generator 202 of metadata server 150 thus generates metadata relating to the content of multimedia data streams 331-334, based on the content of the streams. The metadata may include real-time metadata and static metadata. In other embodiments, metadata relating to multimedia data streams 331-334 may be received from third parties. At step 420, the metadata is provided in real-time within a metadata stream to a plurality of user devices, via an IP network. In the exemplary embodiment, metadata server 150 multicasts a metadata stream carrying the metadata to user devices 160 via network 105. FIG. 3B is an exemplary illustration of a metadata stream 380 that may be multicast by metadata server 150, in accordance with an embodiment.

In some embodiments, the method steps described in FIG. 4 are defined by computer program instructions that are stored in memory 208 of metadata server 150 and executed by processor 204. In one example, metadata generator 202 comprises computer program instructions implemented as computer executable code appropriately programmed by one skilled in the art to perform the algorithm defined by the method steps described in FIG. 4. By executing the computer program instructions, processor 204 executes the algorithm defined by the method steps of FIG. 4.

In an exemplary embodiment, metadata stream 380 is structured in a manner that allows the efficient transport of metadata over network 105 and allows metadata stream 380 to function as a real-time stream vis-à-vis data streams 331-334. Accordingly, time information associated with the metadata in metadata stream 380 is carried within metadata stream 380, as well as information that is used to package the metadata into packets for transmission in accordance with IP protocols.

Various methods may be used to synchronize the metadata within metadata stream 380 with content carried in multimedia data streams 331-334. In one example, multimedia data streams 331-334 include first time information relating to the order and timing in which content in the streams should be shown to a user. Second time information is included in metadata stream 380 indicating when the metadata within the metadata stream should be used or provided to a user.

Figure 5:
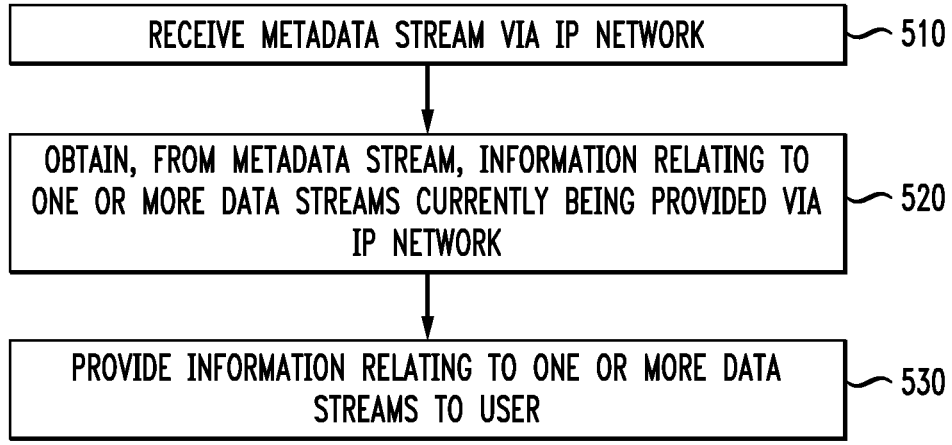
FIG. 5 is a flowchart depicting a method for providing to a user information received in a metadata stream, in accordance with an embodiment.

CAM module 250 continuously receives and monitors metadata stream 380, and provides to the user, via display device 240, selected information from metadata stream 380. FIG. 5 is a flowchart depicting a method for providing to a user information received in a metadata stream, in accordance with an embodiment. At step 510, a metadata stream is received via an IP network. In the exemplary embodiment, CAM module 250 (in user device 160) receives metadata stream 380 via network 105.

At step 520, information relating to one or more data streams currently being provided in the IP network is obtained from the metadata stream. CAM module 250 accordingly extracts from metadata stream 380 metadata relating to multimedia data streams 331-334. CAM module 250 may also extract data from multimedia data streams based on the metadata in metadata stream 380. In an exemplary embodiment, CAM module 250 receives and monitors metadata stream 380 as long as user device 160 is operating. For example, CAM module 250 may continue to receive and monitor metadata stream 380 while a program that is currently being multicast via network 105 is being displayed on display device 240.

At step 530, information relating to the one or more data streams is provided to a user. In the exemplary embodiment, CAM module 250 may display the metadata, and the data extracted from multimedia data streams 331-334 based on the metadata, on display device 240.

In some embodiments, the method steps described in FIG. 5 are defined by computer program instructions that are stored in memory 230 of user device 160 and executed by processor 210. In one example, CAM module 250 comprises computer program instructions implemented as computer executable code appropriately programmed by one skilled in the art to perform the algorithm defined by the method steps described in FIG. 5. By executing the computer program instructions, processor 210 executes the algorithm defined by the method steps of FIG. 5.

Figure 6:
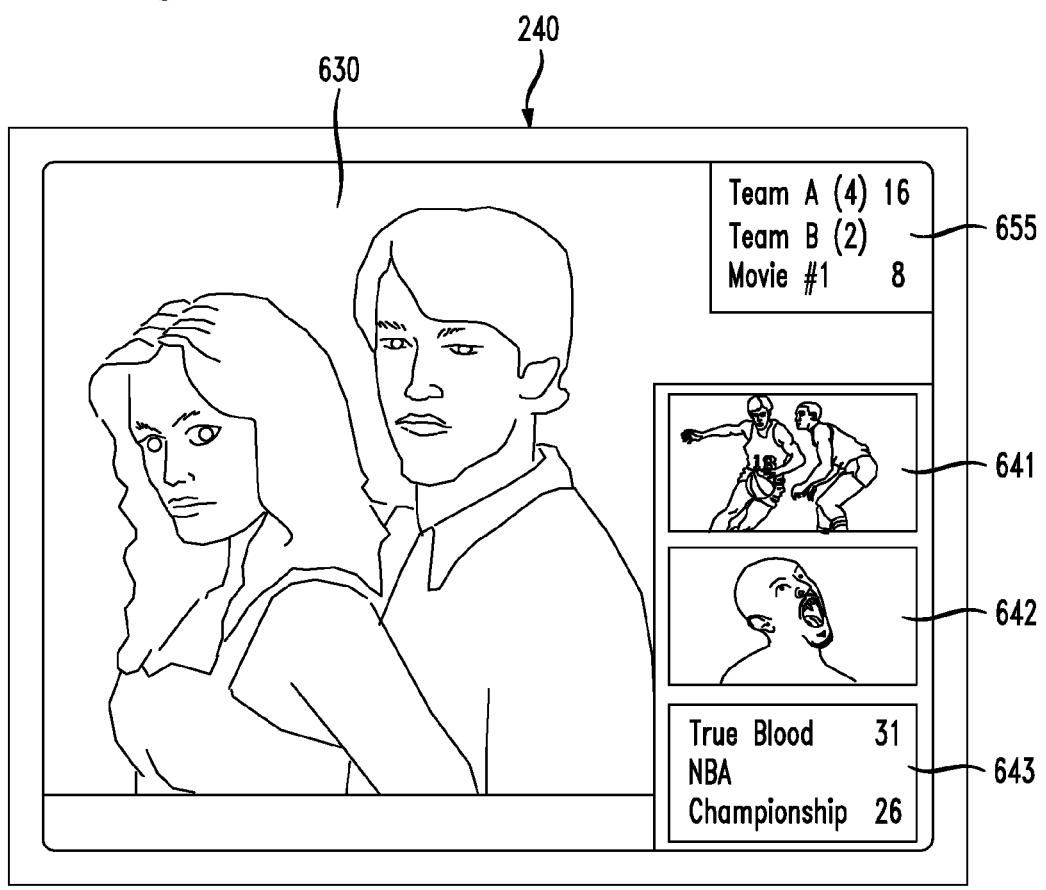
FIG. 6 shows an exemplary display device, in accordance with an embodiment.

In an embodiment illustrated in FIG. 6, CAM module 250 may cause information from metadata stream 380, and selected data obtained from one or more of multimedia data streams 331-334 based on the information in metadata stream 380, to be displayed on display device 240 simultaneously with a program that is currently being multicast and shown on display device 240. FIG. 6 shows an exemplary display device 240 having a first region 630 in which a program that is currently being multicast within communication system 100 is being shown to a user. In this example, suppose that the user is currently watching the program being displayed in region 630. Suppose further that the program displayed in region 630 is received by user device 160 via multimedia data stream 331. While the program is being shown in region 630, CAM module 250 receives and monitors metadata stream 380, obtains from metadata stream 380 information identifying and/or relating to one or more programs currently being multicast in multimedia data streams 332, 333, and 334, and displays information identifying or relating to such programs. In the example of FIG. 6, CAM module 250 displays scenes from two other programs currently being multicast in windows 641 and 642 (located on the right side of display device 240). CAM module 250 also displays a list of selected programs currently being multicast in communication system 100, in region 643 (located in the lower right corner of display device 240). In one embodiment, user device 160 may be configured to allow the user to switch channels to another program by moving a cursor to and clicking on a scene from the program (such as the program displayed in window 641).

CAM module 250 may additionally identify from metadata stream 380 content-specific information relating to programs currently being multicast in multimedia data streams 332, 333, and 334, such as: a current score of a basketball game, the names of actors/actresses that are currently on screen in a movie, the name of a guest who is currently speaking on a talk show, the name of a song that is currently being played at a concert, etc. CAM module 250 may display such content-specific information to the user on display device 240. In the example of FIG. 6, the current score of a hockey match between Team A and Team B that is being multicast is displayed in region 655 (located in the upper right corner of display device 240).

In an exemplary embodiment, CAM module 250 displays selected information extracted from metadata stream 380 in accordance with one or more policies. Information defining various policies may be stored in one or more databases in memory 230 or may be received in metadata stream 380. As used herein, the terms "policy" and "policies" refer to rules controlling the provision of data and information to a user, and may include preferences specified by a user, rules specified by a content provider, or rules specified by a service provider.

In one example, CAM module 250 may display information selected from metadata stream 380, and data selected from multimedia data streams based on the metadata in metadata stream 380, in accordance with one or more user preferences. CAM module 250 may obtain information concerning a user's preferences via a graphical user interface (not shown) that allows a user to specify one or more user preferences relating to programming content. For example, a user may be allowed to specify preferred sports, sports teams, movie genres, actors/actresses, television shows, etc. Such preferences may be stored in user preferences database 292 in memory 230, for example. Subsequently, while monitoring metadata stream 380, CAM module 250 may from time to time examine the stored user preferences to determine the user's preferences, and display information from metadata stream 380, and data from multimedia data streams 331-334, based on the user's preferences. Such information and data may be provided to the user in real-time.

In an illustrative example, suppose that a user specifies that his or her preferences include hockey games and movies starring Joe MovieStar. These preferences are stored in user preferences database 292. Accordingly, while monitoring metadata stream 380, CAM module 250 obtains selected information from metadata stream 380, and uses the metadata to select data from other programs currently being multicast, that pertain to hockey games and Joe MovieStar movies. In the example of FIG. 6, CAM module 250 displays such information in region 655 of display device 240. In this example, a current score of a hockey game between Team A and Team B that is currently being multicast, and a movie ("Movie #1") that stars Joe MovieStar and is currently being multicast, are listed along with the channels on which these programs are available. In other examples, CAM module 250 may display information selected based on user preferences in a different manner.

In another exemplary embodiment, CAM module 250 displays information received via metadata stream 380, and data from multimedia data streams 331-334, in accordance with one or more content provider policies. Information concerning content provider policies may be stored in content provider policies database 294, or may be received via metadata stream 380. Alternatively, information concerning content provider policies may be received via metadata stream 380 and stored in content provider policies database 294. For example, a content provider may stipulate that a particular sporting event is only to be made available to users residing within in a specified geographical area (such as the New York metropolitan area), and that metadata pertaining to the sporting event should only be made available to such users. In one example, information relating to this type of content provider policy may be transmitted in metadata stream 380, in association with other metadata relating to the sporting event in question. CAM module 250 receives the metadata defining such a content provider policy and causes the relevant information to be provided to the user, or withheld from the user, in accordance with the policy.

In another exemplary embodiment, CAM module 250 may display information selected from metadata stream 380 in accordance with one or more service provider policies. Information concerning service provider policies may be stored in service provider policies database 296 or may be received via metadata stream 380. Alternatively, information concerning service provider policies may be received via metadata stream 380 and stored in content provider policies database 294. In an exemplary embodiment, a service provider multicasts a dedicated data stream carrying advertisements, and stipulates, in the form of a service provider policy, that a user device 160 must switch to a channel corresponding to the dedicated advertisement data stream at a specified time (for example, after a particular program ends), to receive and display one or more advertisements. The service provider policy may further stipulate that the user of user device 160 cannot change channels while the advertisement(s) are being shown. In one example, information relating to this type of service provider policy may be transported in metadata stream 380.

In another example, a service provider policy may stipulate that when a predetermined emergency signal is received in metadata stream 380, user device 160 must switch to a dedicated emergency channel to receive emergency information. Information relating to this type of content provider policy may be stored in content provider policies database 296.

In another example, each user device 160 within communication system 100 is associated either with a regular subscription, which allows the user to access a first set of programming channels, or with a premium subscription, which allows the user to access both the first set of program channels and a second set of "premium" channels. In this example, CAM module 250, in a respective user device 160, displays metadata pertaining to content on premium channels only if the respective user device 160 is associated with a premium subscription. Information defining this type of service provider policy may be stored in service provider policies database 296.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for providing information to a user in a communication network, the method comprising:
receiving, by a metadata server, from a content server via an internet protocol network, a multimedia data stream that is being multicast by the content server via the internet protocol network to a plurality of user devices, the multimedia data stream carrying multimedia content;
generating, by the metadata server, real-time metadata relating to the multimedia data stream, based on the multimedia content, the real-time metadata comprising information specifying how the real-time metadata is to be packaged into packets for transmission in accordance with internet protocols;
providing, by the metadata server, the real-time metadata in real-time in a metadata stream to one of the plurality of user devices, via the internet protocol network; and
providing, in the metadata stream, information relating to a content provider policy specifying that the multimedia data stream may be accessed only by users located in a specified geographic region.

2. The method of claim 1, further comprising:
multicasting the real-time metadata in real-time in a metadata stream to the plurality of user devices, via the internet protocol network.

3. The method of claim 1, wherein the multimedia data stream carries information relating to one of: a live sporting event, a live concert, a live news broadcast, a recorded video, and a broadcast television show.

4. The method of claim 3, wherein the multimedia data stream carries information relating to a live event.

5. The method of claim 1, further comprising:
providing, in the metadata stream, information relating to one of: a user preference and a service provider policy.

6. The method of claim 5, further comprising:
providing, in the metadata stream, information relating to a service provider policy stipulating that a user device receiving the metadata stream must receive a second multimedia data stream carrying an advertisement at a specified time.

7. An apparatus for providing information to a user in a communication network, the apparatus comprising:
a processor; and
a memory storing computer program instructions that, when executed by the processor, cause the processor to perform operations comprising:
receiving from a content server via an internet protocol network, a multimedia data stream that is being multicast by the content server via the internet protocol network to a plurality of user devices, the multimedia data stream carrying multimedia content;

generating real-time metadata relating to the multimedia data stream, based on the multimedia content, the real-time metadata comprising information specifying how the real-time metadata is to be packaged into packets for transmission in accordance with internet protocols;

providing the real-time metadata in real-time in a metadata stream to one of the plurality of user devices, via the internet protocol network; and providing, in the metadata stream, information relating to a content provider policy specifying that the multimedia data stream may be accessed only by users located in a specified geographic region.

8. The apparatus of claim 7, the operations further comprising:

multicasting the real-time metadata in real-time in a metadata stream to the plurality of user devices, via the internet protocol network.

9. The apparatus of claim 7, wherein the multimedia data stream carries information relating to one of: a live sporting event, a live concert, a live news broadcast, a recorded video, and a broadcast television show.

10. The apparatus of claim 9, wherein the multimedia data stream carries information relating to a live event.

11. The apparatus of claim 7, the operations further comprising:

providing, in the metadata stream, information relating to one of: a user preference and a service provider policy.

\* \* \* \* \*